2,998,675
Patented Sept. 5, 1961

2,998,675
GLASS BODY HAVING A SEMICRYSTALLINE SURFACE LAYER AND METHOD OF MAKING IT
Joseph S. Olcott, Painted Post, and Stanley D. Stookey, Corning, N.Y., assignors to Corning Glass Works, Corning, N.Y., a corporation of New York
No Drawing. Filed July 1, 1959, Ser. No. 824,178
3 Claims. (Cl. 49—77)

This invention relates to the manufacture of semicrystalline ceramic bodies by the controlled crystallization by heat treatment of glass bodies. Prior semicrystalline bodies were made by melting and shaping a glass which was thereafter treated by heat at controlled temperatures to convert it throughout to the state of finely divided crystals substantially uniformly dispersed in a glassy matrix.

The primary object of this invention is a method of making a glass body having on its surface a thin, compressive, semicrystalline layer of the same oxide composition as the glass.

Another object is to provide a particular range of glass compositions especially suited for use with such method.

Another object is to provide a glass body of high mechanical and thermal strength having a semicrystalline surface by such method.

For some purposes, such as an increase in the mechanical and thermal strength of a glass body, it is desirable to provide it with a compressive stress in and parallel with its surface. One method of accomplishing this is the process known as tempering, which does not alter the oxide composition of the glass and which comprises heating the glass body while avoiding devitrification thereof and then rapidly cooling it. The maximum mechanical strength or modulus of rupture of an abraded tempered glass article of the type used for culinary purposes does not normally exceed 12,000–16,000 p.s.i. as compared to an abraded annealed glass article, the modulus of which is approximately 6,000–8,000 p.s.i.

A higher compressive stress may be produced in the surface of a glass body by the introduction therein of lithium ions by the ionic migration of lithium into the surface in exchange for the potassium and sodium ions of the glass. The surface layer of the glass body thereby acquires a different chemical composition and a lower expansion coefficient than the unaffected interior of the body, which results in a compressive stress in its surface layer. If the glass contains suitable proportions of alumina and silica, such method may also result in the formation of beta-spodumene crystals in its surface, which further lowers its expansion coefficient and increases the surface compressive stress. Such method requires the immersion of the glass body in a bath containing a molten lithium salt heated above the strain point of the glass. Molten salt baths are difficult and dangerous to manipulate.

We have now discovered a new method of producing similar useful effects whereby higher mechanical strengths can be obtained without the use of a molten salt bath while the chemical composition of the glass body remains unchanged throughout.

Broadly the new method comprises heat treating a glass body comprising by weight 65–72 parts of $SiO_2$, not less than 4 parts of $Li_2O$, 22.5–30 parts of $Al_2O_3$, the weight ratio $Li_2O/Al_2O_3$ being not more than about 0.3/1, the total $SiO_2$, $Li_2O$ and $Al_2O_3$ being at least 100 parts by weight, and at least one crystallization catalyst in the indicated amount selected from the class consisting of 0.1–3.5 parts of $TiO_2$, 0.1–5 parts of $B_2O_3$, 0.4–2 parts of $Na_2O$ and 0.5–10 parts of PbO, the total composition being not more than 110 parts by weight, by heating it at a temperature at which its viscosity is between $10^7$ and $10^{10}$ poises for a time ranging from about 1 hour to about 40 hours respectively until microscopic crystals of beta-eucryptite are formed within its surface. The temperature corresponding to a viscosity of $10^7$ poises is somewhat above the softening point, which by definition is the temperature at which the viscosity is about $10^{7.6}$ poises and heat treatments at these temperatures tend to cause deformation unless the glass article is adequately supported. At viscosities less than $10^7$ poises the deformation tendency is impracticably great. On the other hand, heat treatments at viscosities greater than $10^{10}$ poises require times too long to be practicable.

In the above defined range of compositions, glasses having $SiO_2$ contents at or near the minimum and $Li_2O$ contents at or near the maximum have viscosities in the neighborhood of $10^7$ poises at about 970° C. and glasses having $SiO_2$ contents at or near the maximum and $Li_2O$ contents at or near the minimum have viscosities in the neighborhood of $10^{10}$ poises at about 770° C.

As a result of the new method a thin, compressive, semi-crystalline layer containing a multiplicity of microscopic and submicroscopic crystals of beta-eucryptite ($Li_2O \cdot Al_2O_3 \cdot 2SiO_2$) as the primary crystalline phase and having a linear thermal expansion coefficient substantially lower than that of the glass per se is formed in and below its surface.

It is characteristic of the method of this invention that it causes such crystallization to occur only in the surface of the glass while leaving the interior thereof substantially unchanged with its original transparency; and that the resulting article as a whole is substantially transparent on account of both the thinness of such semicrystalline layer (about 0.1 mm.) and the relative similarity of the refractive indices of the crystals and the glass, there being at the most a slight translucency of the surface. The linear expansion coefficient of the semicrystalline layer is substantially lower than that of the glass interior, because the crystalline beta-eucryptite, which is formed, has a cubical expansion coefficient in the neighborhood of zero. Moreover, the expansion coefficient of the residual glassy matrix surrounding such crystals is also relatively lower than that of the unchanged glass of the interior, because the formation of the beta-eucryptite has left the matrix with a lower available content of $Li_2O$ per se, which has a high thermal expansion factor. The lower expansion coefficient of the semicrystalline surface layer relative to that of the interior of the glass establishes a uniform compressive stress in and parallel to the surface after the article is cool whereby the modulus or rupture of the article is substantially increased. The formation of such semicrystalline surface layer is dependent upon the presence in the glass of a nucleating agent or crystallization-promoting agent.

The proportions of the above-recited ranges of $SiO_2$, $Li_2O$, $Al_2O_3$ and crystallization catalyst are critical for the purpose of this invention and such limits should be maintained for the following reasons: When the $SiO_2$ content is below 65 parts by weight and the $Al_2O_3$ content is above 30 parts the crystallization catalyst is not essential for promoting the surface crystallization but when the $SiO_2$ content is over 72 parts and the $Al_2O_3$ content is less than 22.5 parts a satisfactory semicrystalline surface layer cannot be produced. The liquidus of the glass becomes too high and the glass crystallizes throughout, if the $Li_2O$ content is more than about ⅓ the amount of $Al_2O_3$ but the glass is difficult to melt and the desired crystallization in its surface cannot be brought about if the $Li_2O$ content is less than about 4 parts. Compositions in which the weight ratio $Li_2O/Al_2O_3$ is substantially more than about 0.3/1 tend to crystallize throughout when heat treated. More than about 3.5% TiO$_2$ causes crystallization to occur throughout the glass; excessive B$_2$O$_3$ or Na$_2$O or PbO causes a diminution in the mechanical strength of the finished product. The presence of any substantial amount of K$_2$O weakens the final product.

Other compatible metal oxides may also be present provided their total amount does not exceed about 10 parts. Such compatible metal oxides include the oxides of the metals of the second periodic group.

In another application Serial No. 824,179, filed July 1, 1959 concurrently herewith, we have disclosed and claimed a method and an article similar to the method and the article of this application but utilizing glasses which contain less than 65 parts of SiO$_2$ and more than 30 parts of Al$_2$O$_3$ and in which TiO$_2$, B$_2$O$_3$, Na$_2$O and PbO are optional but not essential constituents.

The present invention is illustrated by way of examples in Table I in which are shown the compositions of glasses falling within the above-stated range calculated from their respective batches to the oxide basis in parts by weight, exclusive of minor impurities in the batch materials.

Table I

|  | 1 | 2 | 3 | 4 | 5 | 6 | 7 | 8 | 9 | 10 |
|---|---|---|---|---|---|---|---|---|---|---|
| SiO$_2$ | 66.7 | 67.9 | 68.7 | 70.6 | 69.1 | 70.5 | 71.5 | 72.7 | 67.9 | 70.6 |
| Al$_2$O$_3$ | 26.2 | 26.8 | 25.8 | 23.8 | 26.4 | 24.4 | 23.4 | 22.8 | 26.8 | 24.5 |
| Li$_2$O | 7.1 | 5.3 | 5.5 | 5.6 | 4.5 | 5.1 | 5.1 | 4.5 | 5.3 | 4.9 |
| B$_2$O$_3$ | 1.3 | 0.9 | 0.9 |  | 0.1 | 0.1 | 0.1 | 0.1 | 0.5 | 0.1 |
| Na$_2$O |  |  | 0.2 |  |  |  |  |  |  |  |
| TiO$_2$ |  |  |  | 2.5 | 0.8 | 0.8 | 0.8 | 0.8 |  | 3.3 |
| PbO |  |  |  |  |  |  |  |  | 2.9 |  |

The same compositions are shown in Table II in weight percent together with the times (hrs.) and temperatures (° C.) of heat treatment and the moduli of rupture (p.s.i.×10$^{-3}$) of the resulting article having a semicrystalline surface layer.

Table II

|  | 1 | 2 | 3 | 4 | 5 | 6 | 7 | 8 | 9 | 10 |
|---|---|---|---|---|---|---|---|---|---|---|
| SiO$_2$ | 65.7 | 67.3 | 68.0 | 68.8 | 68.4 | 69.9 | 70.9 | 71.9 | 65.6 | 68.3 |
| Al$_2$O$_3$ | 26.0 | 26.6 | 25.5 | 23.4 | 26.2 | 24.2 | 23.2 | 22.7 | 25.9 | 23.7 |
| Li$_2$O | 7.0 | 5.2 | 5.4 | 5.4 | 4.5 | 5.0 | 5.0 | 4.5 | 5.1 | 4.7 |
| B$_2$O$_3$ | 1.3 | 0.9 | 0.9 |  | 0.1 | 0.1 | 0.1 | 0.1 | 0.5 | 0.1 |
| Na$_2$O |  |  | 0.2 |  |  |  |  |  |  |  |
| TiO$_2$ |  |  |  | 2.4 | 0.8 | 0.8 | 0.8 | 0.8 |  | 3.2 |
| PbO |  |  |  |  |  |  |  |  | 2.9 |  |
| Hrs | 8 | 21 | 15 | 17.5 | 14 | 12 | 12 | 12 | 15 | 13 |
| ° C | 800 | 900 | 900 | 875 | 900 | 925 | 925 | 925 | 900 | 900 |
| p.s.i.×10$^{-3}$ | 29.3 | 79.6 | 70.6 | 53.8 | 17.3 | 35.4 | 33.8 | 16 | 75 | 44 |

The batch materials for the above glasses may comprise any materials, either oxides or other compounds, which, on being fused together, are converted to the desired oxide compositions in the desired proportions. Preferably, compounds such as petalite or spodumene, comprising 2 or more of the oxides of the final composition should be used in order to provide glasses of optimum homogeneity. Although it is immaterial whether the batches contain oxidizing or reducing agents, they preferably should either contain oxidizing agents or should be neutral and contain neither an oxidizing nor a reducing agent in order to avoid the difficulties normally encountered in fining reduced glasses. Fining of the present glasses was accomplished by adding As$_2$O$_3$ to the batch. Too large an amount of As$_2$O$_3$, say more than 1% tends to diminish the strength of the final product. The reason for this is not known. The As$_2$O$_3$ was omitted from the tables for convenience, since the residual amount normally remaining in the glass is too small to have any material effect on its fundamental properties. The batches should be melted for at least 4 hours or more at about 1400° C. or as much higher as may be necessary to produce homogeneous melts in crucibles, pots or tanks depending upon the size of the melt.

The modulus of rupture is measured by supporting individual rods of the semicrystalline product, about ¼ inch in diameter and 4 inches long, on 2 knife edges spaced 3½ inches apart and individually loading them on 2 downwardly acting knife edges about ¾ inch apart and centrally spaced from the lower knife edges until breakage of the rods occurs. To make the results more comparable, the rods are first abraded by being rolled in a ball mill for 15 minutes with 30 grit silicon carbide. Ordinarily, five or more rods are thus tested to obtain the average value which is calculated in p.s.i. Abraded rods of annealed glass in general, when measured in this manner, show moduli of rupture ranging from 6,000 to 8,000 p.s.i.

It is believed that microscopic cracks in the surface of the glass before it is heat treated, may have a weakening effect on the modulus of rupture of the finished article. In order to eliminate such cracks and avoid such effect the glass article may, if desired, be acid washed before being heat treated. Acid washing for this purpose is known as fortification and preferably comprises immersing the article for about 10 seconds in a solution composed of equal parts of 70% aqueous HF, concentrated H$_2$SO$_4$ and water; rinsing it in a 5% aqueous solution of HNO$_3$; and thereafter rinsing it in water. Such acid washing may be repeated several times, if desired, although a single treatment ordinarily is effective.

In carrying out the invention, articles composed of the above described glasses are heat treated at the viscosities and for the time set forth above or until their moduli of rupture exceed about 15,000 or, preferably, 20,000 p.s.i. It has been found desirable to limit the rate of temperature increase of articles having a thickness of about ¼ inch or more to a maximum of about 5° C. per minute, in order to avoid excessive thermal gradients which might cause shattering, although much higher rates can be tolerated if the bodies are thin and substantially uniform in cross section. Instead of raising the temperature and holding it for a specific length of time, the temperature may be raised continually through the stated range of viscosities at a rate so slow that surface crystallization adequate for the present purpose will have occurred when a viscosity in the neighborhood of 10$^7$ poises or less is attained.

We have found that only glasses which comprise primarily of Li$_2$O, Al$_2$O$_3$ and SiO$_2$ within the above stated ranges of proportions and having the stated amounts of crystallization catalysts incorporated therein, are effective for carrying out the new method and producing the above described new article.

What is claimed is:

1. The method of making a glass body with a high modulus of rupture having on its surface a thin, compressive, semi-crystalline layer of the same oxide composition as the glass, which comprises heat treating a glass body comprising by weight 65–72 parts of $SiO_2$, not less than 4 parts of $Li_2O$, 22.5–30 parts of $Al_2O_3$, the weight ratio $Li_2O/Al_2O_3$ being not more than about 0.3/1, the total $SiO_2$, $Li_2O$ and $Al_2O_3$ being at least 100 parts by weight, and at least one crystallization catalyst in the indicated amount selected from the class consisting of 0.1–3.5 parts of $TiO_2$, 0.1–5 parts of $B_2O_3$, 0.4–2 parts of $Na_2O$ and 0.5–10 parts of PbO, the total $SiO_2$, $Li_2O$, $Al_2O_3$ and crystallization catalyst being not more than 110 parts by weight by heating it at a temperature at which its viscosity is between $10^7$ and $10^{10}$ poises for a time ranging from about 1 hour to about 40 hours respectively until microscopic and submicroscopic crystals of beta-eucryptite are formed within its surface.

2. The method of claim 1 in which the glass body is fortified by acid washing before being heat treated.

3. An article comprising a glass body having in its entire surface a thin, compressive, semicrystalline layer containing a multiplicity of microscopic crystals of beta-eucryptite and having a linear thermal expansion coefficient substantially lower than that of the glass body, the oxide composition of the article being substantially the same throughout and comprising 65–72 parts of $SiO_2$, not less than 4 parts of $Li_2O$, 22.5–30 parts of $Al_2O_3$, the weight ratio $Li_2O/Al_2O_3$ being not more than about 0.3/1, the total $SiO_2$, $Li_2O$ and $Al_2O_3$ being at least 100 parts by weight, and at least one crystallization catalyst in the indicated amount selected from the class consisting of 0.1–3.5 parts of $TiO_2$, 0.1–5 parts of $B_2O_3$, 0.4–2 parts of $Na_2O$ and 0.5–10 parts of PbO, the total $SiO_2$, $Li_2O$, $Al_2O_3$ and crystallization catalyst being not more than 110 parts by weight.

References Cited in the file of this patent

UNITED STATES PATENTS

| | | |
|---|---|---|
| 2,143,796 | Phillips | Jan. 10, 1939 |
| 2,241,511 | Greene | May 13, 1941 |

FOREIGN PATENTS

| | | |
|---|---|---|
| 551,562 | Canada | Jan. 14, 1958 |

OTHER REFERENCES

Article by Pavlushkin, in May 1958, issue of The Glass Industry, page 275.

Article by Knapp, in June 1959, issue of The Glass Industry, page 307.